(12) United States Patent
Wiemker et al.

(10) Patent No.: US 7,643,663 B2
(45) Date of Patent: Jan. 5, 2010

(54) VOLUME MEASUREMENT IN 3D DATASETS

(75) Inventors: Rafael Wiemker, Kisdorf (DE); Thomas Blaffert, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 814 days.

(21) Appl. No.: 10/551,028

(22) PCT Filed: Mar. 22, 2004

(86) PCT No.: PCT/IB2004/050303

§ 371 (c)(1),
(2), (4) Date: Sep. 29, 2005

(87) PCT Pub. No.: WO2004/088589

PCT Pub. Date: Oct. 14, 2004

(65) Prior Publication Data

US 2006/0247510 A1 Nov. 2, 2006

(30) Foreign Application Priority Data

Apr. 4, 2003 (EP) .................................. 03100898

(51) Int. Cl.
*G06K 9/00* (2006.01)
(52) U.S. Cl. ..................................................... 382/131
(58) Field of Classification Search ........................ None
See application file for complete search history.

(56) References Cited

U.S. PATENT DOCUMENTS

| 5,859,191 | A  | 1/1999 | Miller et al.   |
| 6,112,112 | A  | 8/2000 | Gilhuijs et al. |
| 6,366,800 | B1 | 4/2002 | Vining et al.   |

FOREIGN PATENT DOCUMENTS

| WO | 0154065  | A1 | 7/2001  |
| WO | 02085211 | A2 | 10/2002 |

OTHER PUBLICATIONS

Paul A Brathwaite, et al: Lunem Detection in Human IVUS Images Using Region-Growing, IEEE Sep. 1996, pp. 37-40, XP010205882.
Gunilla Borgefors: Distance Transformations in Digital Images, Graphics and Image Processing vol. 34, 1986, pp. 344-371.
D. Wormanns, et al: Clinical Evaluation of the Reproducibility of Volume Measurements of Pulmonary Nodules, Proc. SPIE Medical Imaging 2002, vol. 4684, pp. 316-322.
C. L. Wyatt, et al: Automatic Segmentation of the Colon for Virtual Colonscopy, Medical Imaging and Graphics vol. 24, 2000, pp. 1-9.

*Primary Examiner*—Charles Kim

(57) ABSTRACT

Volume measurement of for example a tumor in a 3D image dataset is an important and often performed task. The problem is to segment the tumor out of this volume in order to measure its dimensions. This problem is complicated by the fact that the tumors are often connected to vessels and other organs. According to the present invention, an automated method and corresponding device and computer software are provided, which analyze a volume of interest around a singled out tumor, and which, by virtue of a 3D distance transform and a region drawing scheme advantageously allow to automatically segment a tumor out of a given volume.

8 Claims, 16 Drawing Sheets

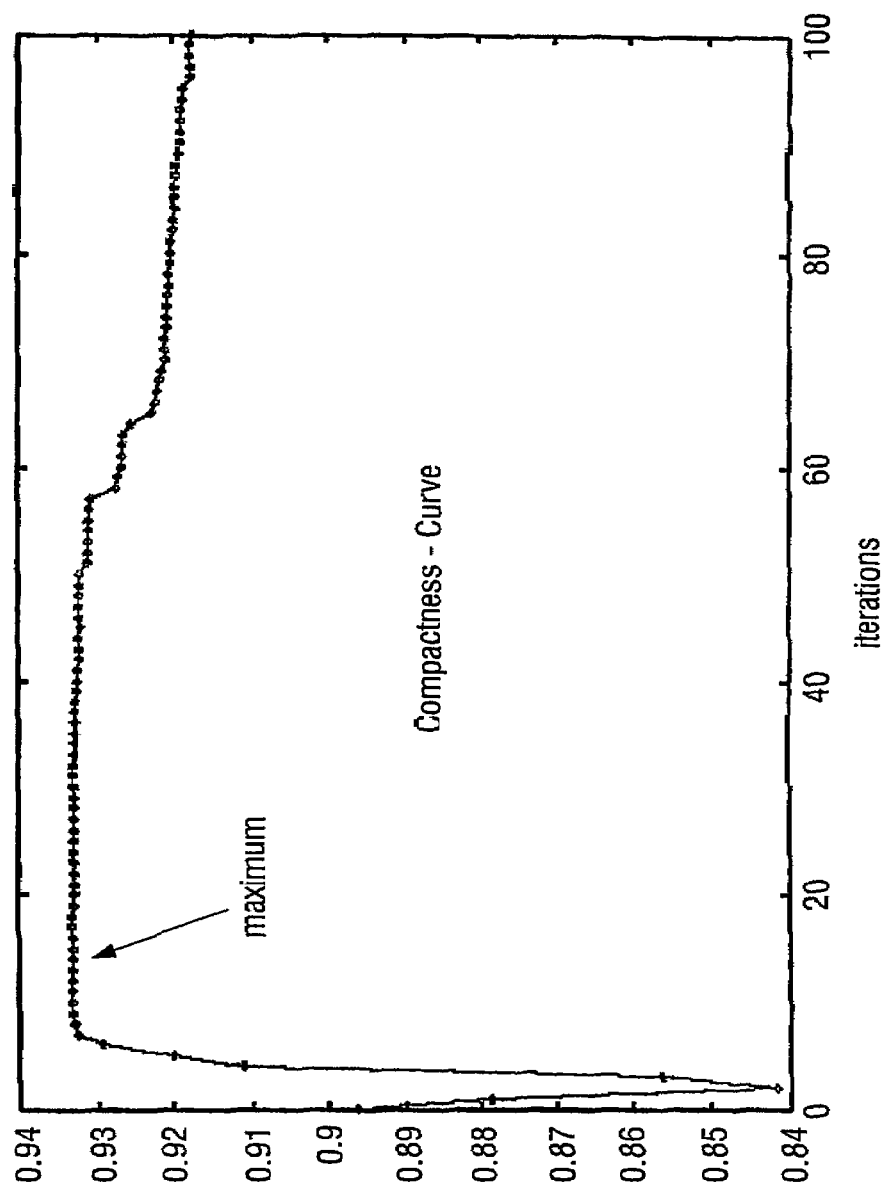

VOLUME MEASUREMENT IN 3D DATASETS

The present invention relates to volumetric measurements applied to 3D datasets. The datasets may be acquired via computed tomography (CT), magnetic resonance imaging (MRI) or x-ray scanning. In particular, the present invention relates to a method for determining a volume of an object from three-dimensional volume data, an image processing device for volume measurements and a computer program, comprising computer code means performing volume measurements when executed on a computerized image processing device.

When it is discovered that an individual has a disease, such as cancer, generally there may be a mass of infected tissue to be observed regularly to determine an extent and a progress of the disease and how any proposed treatment may affect the diseased tissue. Therefore, the measurement of a volume of objects such as tumors in a three-dimensional image dataset is an important and frequently performed task. Moreover, an individual may have some type of abnormality in an internal organ that is to be observed in order to determine the proper type of treatment required.

Today, there are a number of systems that may be used to observe cancerous masses or abnormal organs. For example, x-ray, magnetic resonance imaging, computer tomography or other similar types of systems, non-invasively provide three-dimensional image datasets for the observations required and produce images of the areas to be observed.

To view the affected tissue mass or abnormal organ, a series of two-dimensional images of sections of the patient may be combined to produce three-dimensional image sets. For this, the two-dimensional images must be aligned so that the most accurate correspondences between anatomic units are maintained. Digital images obtained directly from a CT or MRI scanner are generally automatically in register and may be used directly to generate the three-dimensional volume data.

In the case of computer tomography image scans, the three-dimensional volume data includes a plurality of two-dimensional image slices, wherein each image slice comprises an array of Hounsfield units corresponding to attenuation coefficients of the respective body material to which the x-ray beams have been applied.

Tumor volume measurement is a typical task for example in oncology, to monitor growth or shrinkage between follow-up examinations. Such monitoring is carried out for diagnosing and staging cancer as well as during therapy. Volume measurement often has to be done for tens of tumors for a single patient and for multiple follow-up examinations. Usually this is done manually by measuring the dimensions of the tumors in images and estimating their volume.

Apart from being very tedious and operator dependent, this task requires a high degree of experience on the part of the operator in order to produce reliable results.

U.S. Pat. No. 5,859,191 discloses an outer segmentation/outer contouring system and method for use with three-dimensional radiation therapy treatment planning, wherein a polygon is expanded within boundaries of an object to compute a boundary of the object based on a shape of the expanded polygon.

U.S. Pat. No. 6,112,112 discloses a method for assessing tumor extent in medical temporarily acquired images where image data is obtained corresponding to temporarily acquired images, including a tumor and surrounding anatomy and performing a variance processing with respect to time on the obtained image data to derive variance image data defining a variance image indicative of a variation of voxels in the temporarily acquired medical images over time.

A problem with the known volume measurement systems is to segment the object, i.e. the tumor, out of the three-dimensional dataset in order to measure its volume. This problem is complicated by the fact that tumors are often connected to vessels and other organs.

It is an object of the present invention to provide for an improved volume measurement of an object from three-dimensional volume data.

According to an exemplary embodiment of the present invention as set forth in claim 1, the above object may be solved with a method for determining a volume of an object from three-dimensional volume data including graphic information units, wherein a volume of interest including the object is determined. In the volume of interest, thresholds of the graphic information units are determined. On the basis of the thresholds, a distance transform is performed for determining a distance map consisting of voxels. A seed point is provided in the distance map, which is on the object used to determine a number of core-voxels and a number of front-voxels. The volume of the object in the volume of interest is determined on the basis of the number of core-voxels and the number of front-voxels.

Advantageously, this exemplary embodiment of the present invention is a very fast an real-time capable method, which leads to visually satisfactory and dependable segmentation results. This allows to speed up the workflow of a clinician, eliminates the tedious and frequently required task of manually measuring volumes of, for example, tumors and yields very accurate and reproducible results. In contrast to the manual determination, such a method according to an exemplary embodiment of the present invention, which may be performed on a computer, may require only a single operation on the part of the operator, namely a single mouse-click at the approximate tumor center for the dependable automatic determination of the volume of the tumor. Instead of a manual definition of the seed point, also a rough segmentation method may be used for determining the approximate center of the tumor.

Claim 2 provides another exemplary embodiment of the method according to the present invention, which ensures an expansion of voxels with a varying growth speed. According to an exemplary embodiment of the present invention, the voxels may be expanded immediately ("fast") as long as the growth goes downwards in the distance map relief and the new voxel has no other neighbor which offers a steeper descent to it than the referring voxel. Such "downHill" expansion advantageously ensures that tumors are grown outwards into spiculi and lobules. Moreover, the downHill expansion advantageously ensures a growth parallel to the gradient factors of the distance map and thus perpendicular to the skeleton or the ridge lines of the distance map relief.

According to another exemplary embodiment of the present invention as set forth in claim 3, a priority criterion is introduced and used for "slow" growth. A maximum directional second derivative $L_{max}(x)$ in the distance map indicates how close a front-voxel is to the center of the tumor and the priority criterion thus ensures that growth is always continuing as close as possible to the approximate tumor center. Advantageously, this may achieve robustness against varying seed points. Advantageously, this priority criterion, namely the $L_{max}(x)$ criterion also ensures and even may steer the growth towards the highest peak in the distance map, if the tumor consists of several local peaks in the distance map.

According to another exemplary embodiment of the present invention as set forth in claim 4, a cutoff criterion is used to cut off the growth. According to this exemplary embodiment of the present invention, a final decision with respect to the point at which the growth is to be cut off is made in retrospect, after localization of the minimum point of the curve of the sum of voxel distance values of the front-voxels in the distance map. Advantageously, this ensures that connecting vessels or vaults are cut off at their thinnest points.

According to another exemplary embodiment of the present invention as set forth in claim 5, a method is provided which is particularly suitable for volumetric measurements on pulmonary nodules in high resolution CT datasets as from multi-slice and cone-beam CT scanners. Advantageously, this method allows automatic volumetric pulmonary nodule measurements, which are highly dependable.

Another exemplary embodiment of the present invention as set forth in claim 6 provides for an image processing device comprising a memory for storing three-dimensional volume data and an image processor for determining a volume of an object from the three-dimensional volume data which includes graphic information units. In this exemplary embodiment, the volume of the object is determined on the basis of a number of core-voxels and a number of front-voxels of the object. Advantageously, the image processing device according to this exemplary embodiment provides for fast, even real-time measurements. Furthermore, it provides for visually satisfactory segmentation results, allowing for dependable volume measurements with reproducible results. In clinical applications, it allows to relieve the radiologist and to speed up his or her workflow. Furthermore, since the volume measurement is automated, the operator dependability is reduced significantly. Furthermore, this image processing devices according to the present invention may be operated by an operator having only minimum experience in this field.

Another exemplary embodiment of the present invention as set forth in claim 7 controls a growth speed of the expansion of the voxels in a variable manner, ensuring an inclusion of spiculi and lobules in the growth and an expansion growth perpendicular to ridge lines of the distance map relief.

Another exemplary embodiment of the present invention as set forth in claim 8 provides for a priority criterion for slow growth and a cutoff criterion ensuring a robustness against varying seed points and a cutoff of connecting vessels or vaults at the thinnest points.

According to another exemplary embodiment of the present invention as set forth in claim 9, the image processing device is a computer aided tumor volumetric measuring device for computer aided measurements on the basis of computed tomography image scans, which advantageously may allow for automatic volume measurements of tumors.

Another exemplary embodiment of the present invention as set forth in claim 10 provides for a computer program which may be stored on a computer readable medium, comprising computer code means allowing for dependable automatic volume measurements of an object such as a tumor from three-dimensional datasets, such as data sets from CT scanners. The computer program according to the present invention is preferably loaded into a working memory of a data processor, such as an image processor of an image processing device. The data processor is thus equipped to carry out the method of the exemplary embodiment of the present invention. The computer program may be stored on a computer readable medium such as a CD-Rom. The computer program may also be presented over a network such as the world wide web and can be downloaded into the working memory of a data processor from such a network.

It may be seen as the gist of an exemplary embodiment of the present invention that an automated volume measurement is provided, which analyses a volume of interest around a singled-out object of interest by using a 3D distance transform and a region growing scheme. The region growing scheme includes a downHill expansion, a control of a growth direction by using a priority criterion for a slow growth and by retrospectively deciding on a cutoff point of the growth on the basis of a minimum point of a curve of a sum of front-voxel distance values.

"Core-voxels" are all voxels which have already been processed (included) by the growth process and are surrounded on all sides by other voxels which also have already been included in the growth process.

"Front-voxels" are all voxels which have already been included by the growth process, but are adjacent to one or more neighboring voxels which have not yet been included by the growth process.

These and other aspects of the present invention are apparent and will be elucidated with reference to the embodiments described hereinafter and with reference to the following drawings:

FIG. 10 shows a compactness as a function of iterations.

Figure 1:
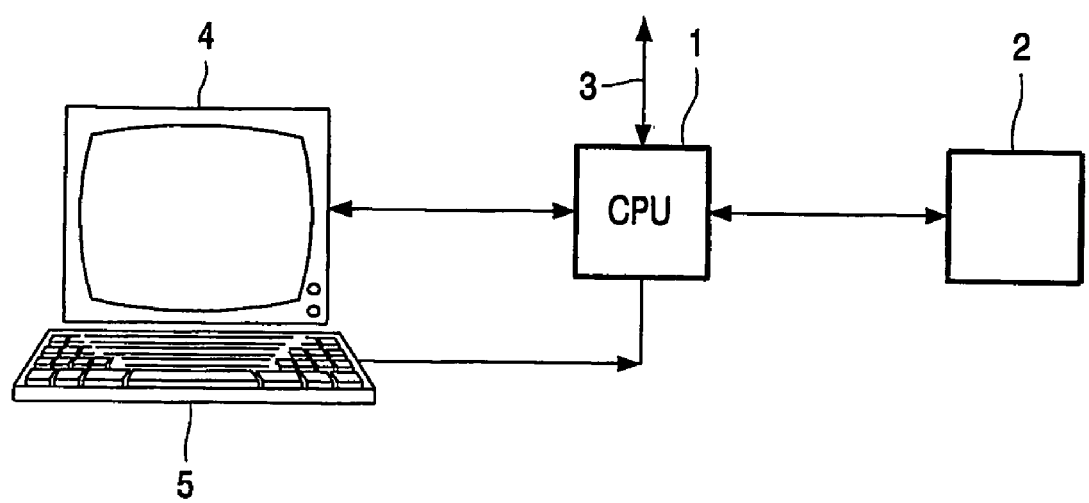
FIG. 1 shows and exemplary embodiment of an image processing device according to the present invention, which is adapted to execute an exemplary embodiment of a method for determining a volume of an object according to the present invention.

FIG. 1 depicts an exemplary embodiment of an image processing device according to the present invention for executing an exemplary embodiment of a method in accordance with the present invention. The image processing device depicted in FIG. 1 comprises a central processing unit (CPU) or image processor 1 connected to a memory 2 for storing three-dimensional volume data. The image processor 1 may be connected to a plurality of input/output-network or diagnosis devices such as an MR device, a CT device or a x-ray device. The image processor 1 is furthermore connected to a display device 4, (for example a computer monitor) for displaying information or images computed or adapted in the image processor 1. An operator may interact with the image processor 1 via a keyboard 5 and/or other input/output devices such as a mouse, which are not depicted in FIG. 1.

In the following, the present invention will be described with respect to a volume measurement on the basis of computer tomography (CT) image scans, which were combined to three-dimensional datasets, where a nodule at a lung wall is segmented and a volume of which is measured. In this respect it should also be pointed out that the method may not be concerned to obtain sub-voxel accurate volume estimations, but to identify voxels which belong to the tumor core and to estimate the volume on the basis of the number of voxels belonging to the segmented tumor core. Also, it should be noted that instead of using a CT scanner to obtain the three-dimensional volume data, x-ray scanners or MRI scanners may be used.

Figure 2A:
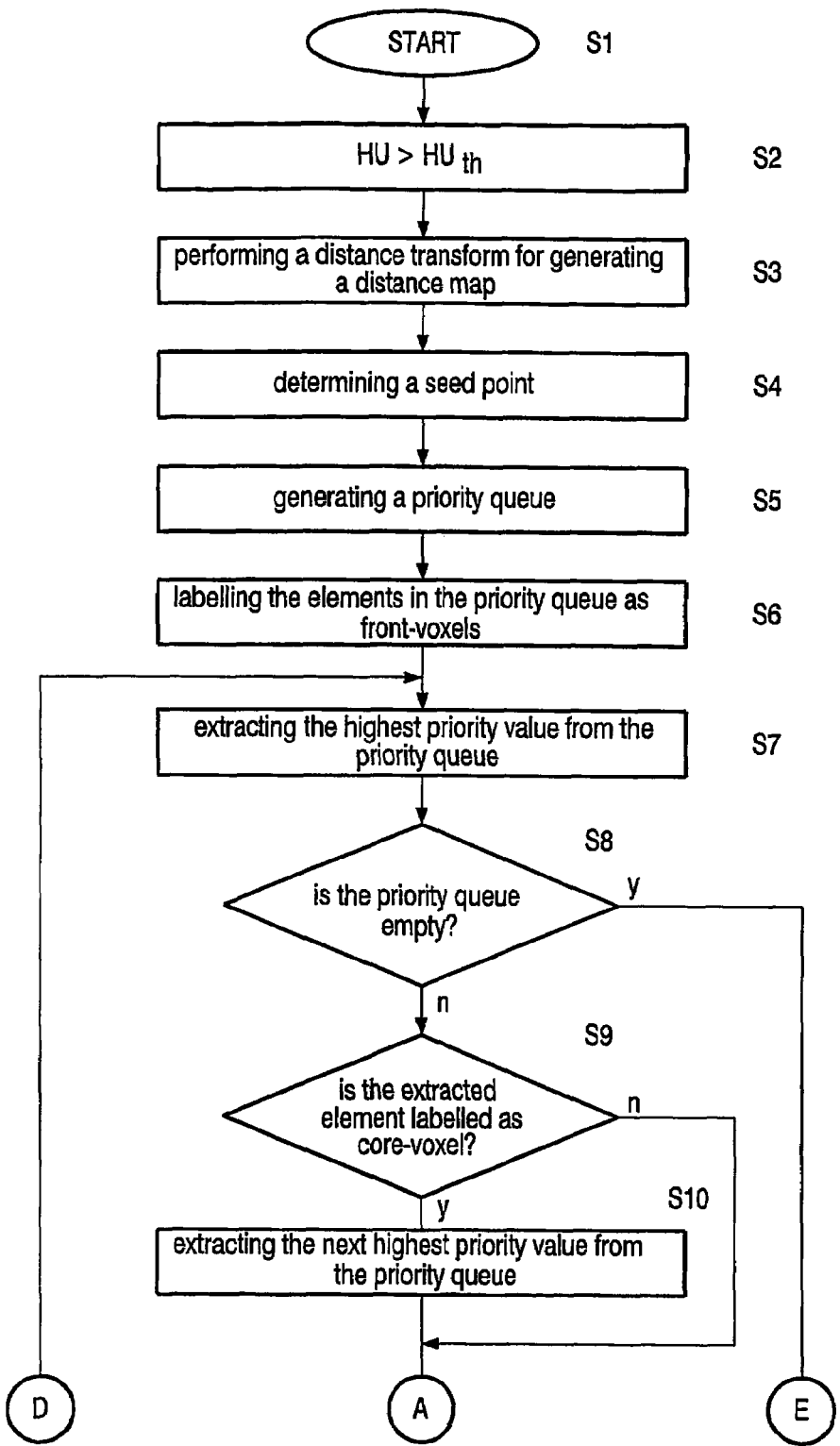
FIGS. 2a to 2c are a flow-chart of an operation of the image processing device of FIG. 1 according to an exemplary embodiment of a method for determining the volume of an object according to the present invention.
Figure 2B:
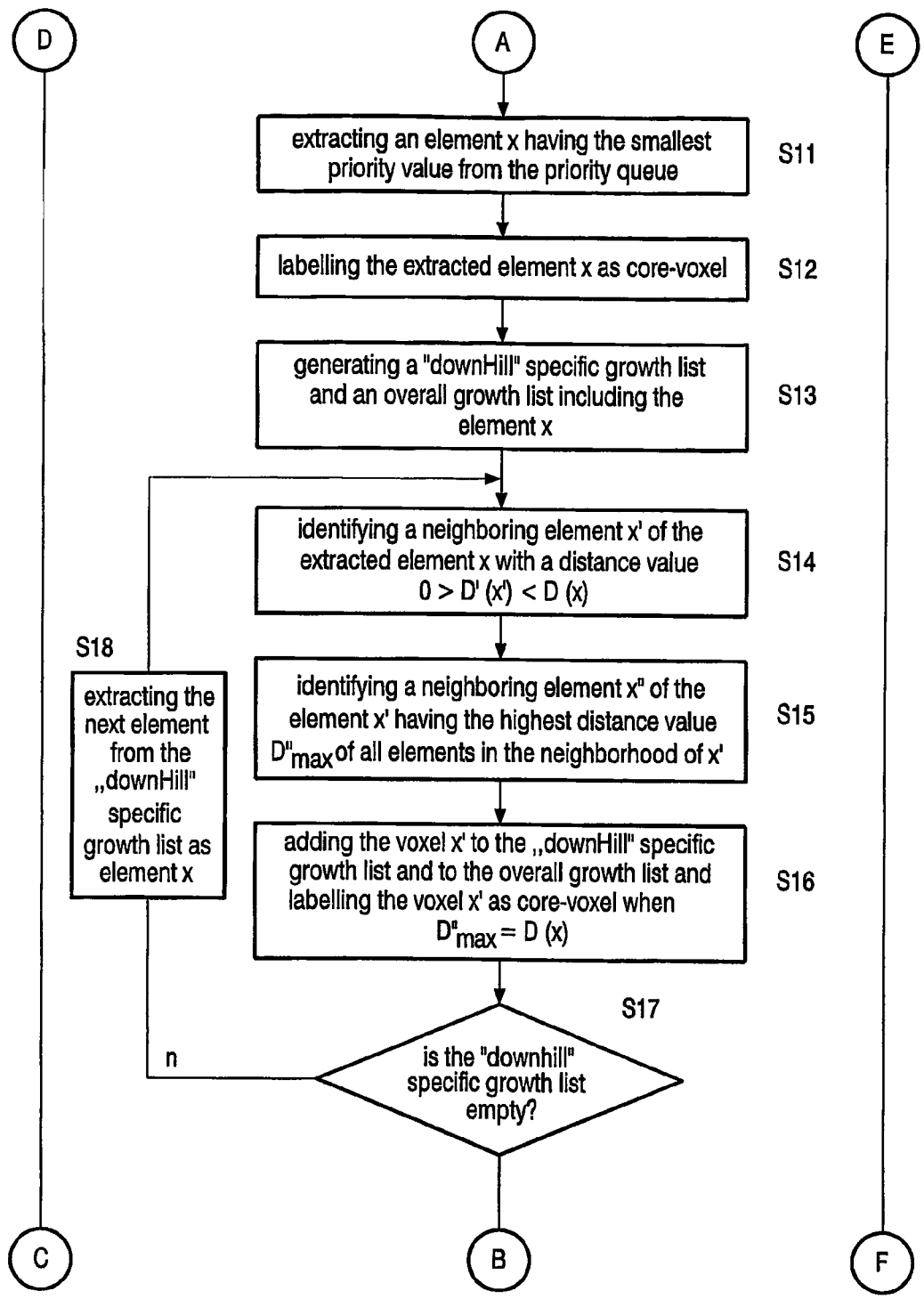
Figure 2C:
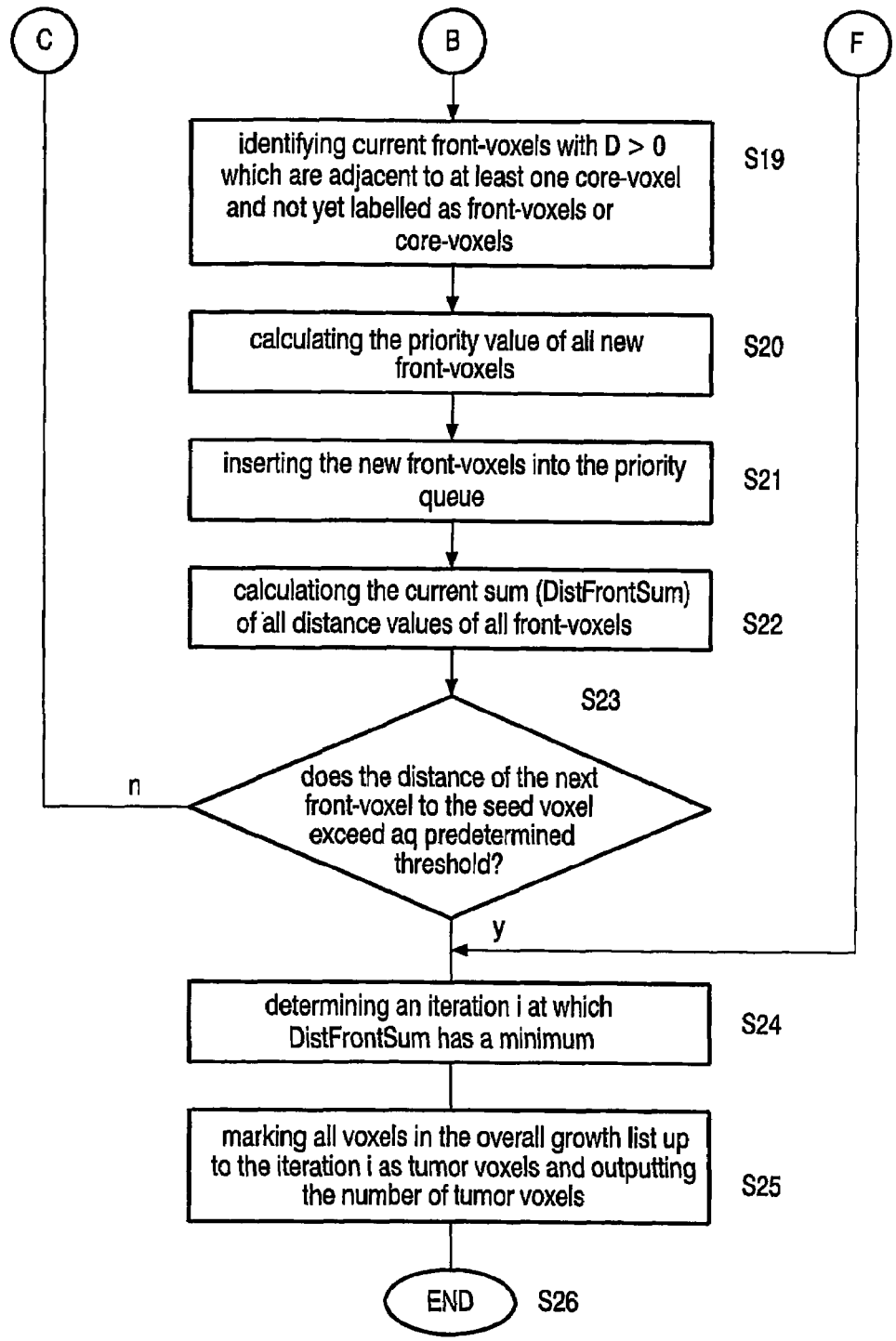
Figure 3A:
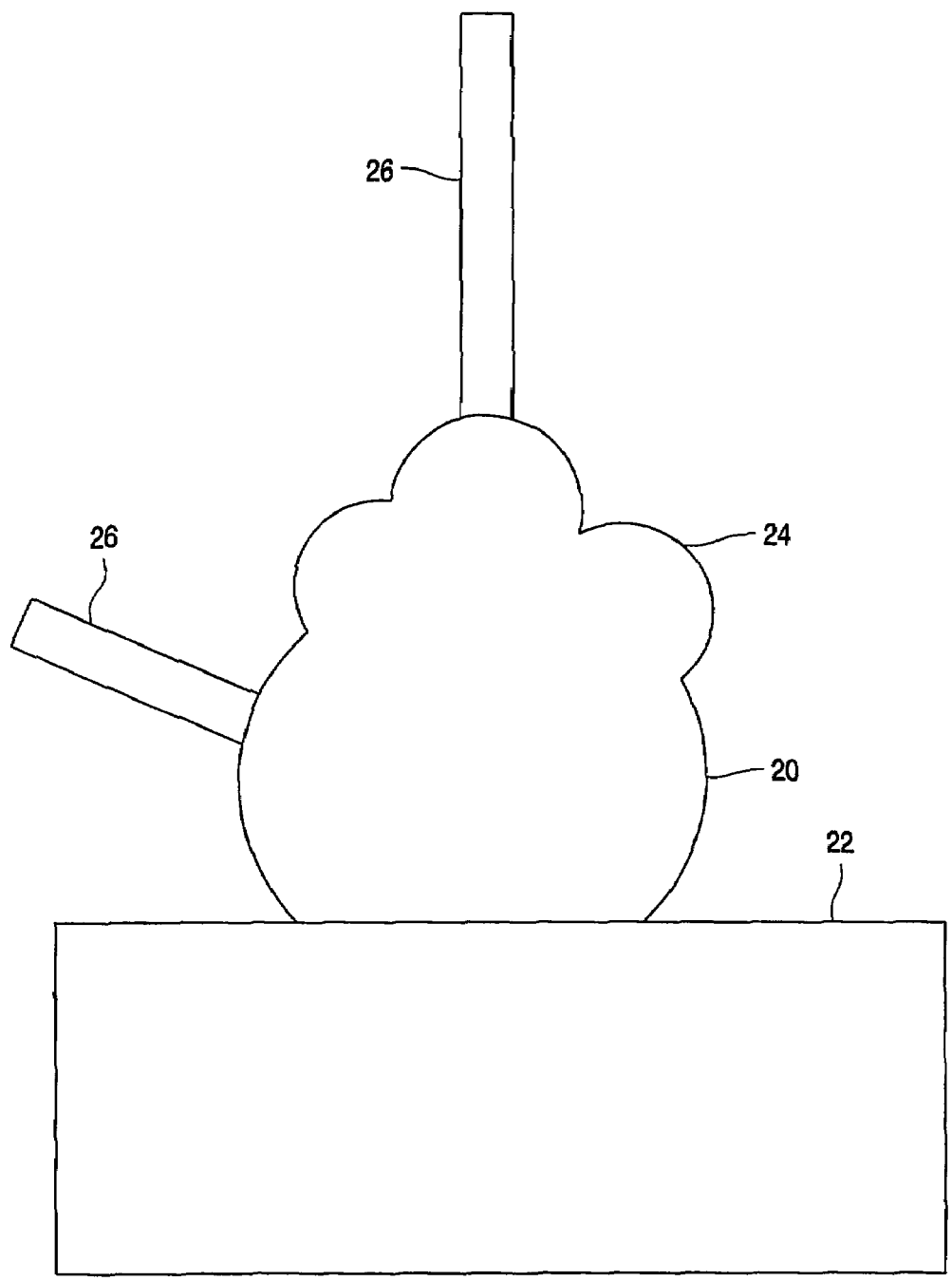
FIG. 3 is a simplified representation depicting an exemplary embodiment of an iterative region going process according to the present invention.
Figure 3B:
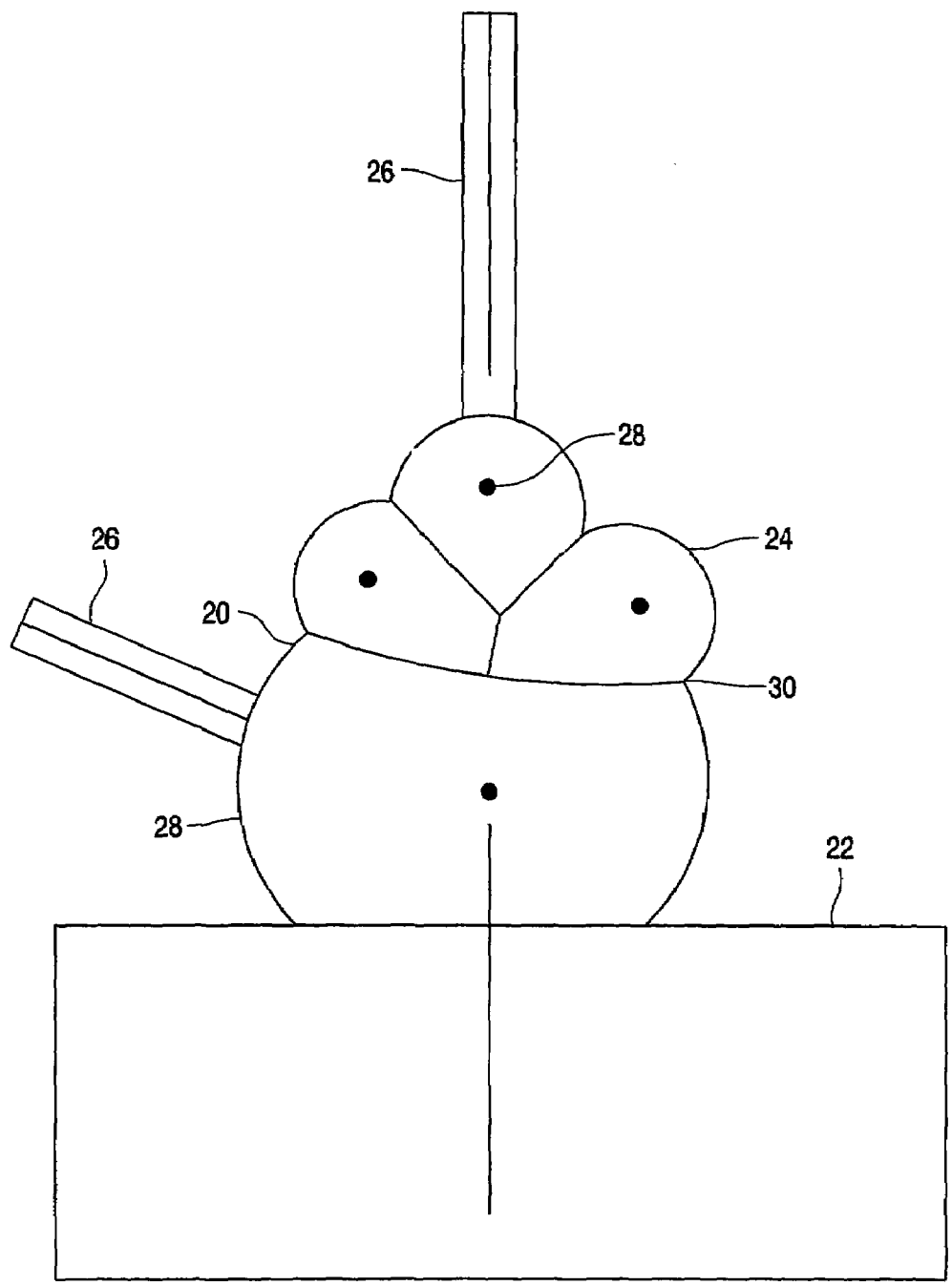
Figure 3C:
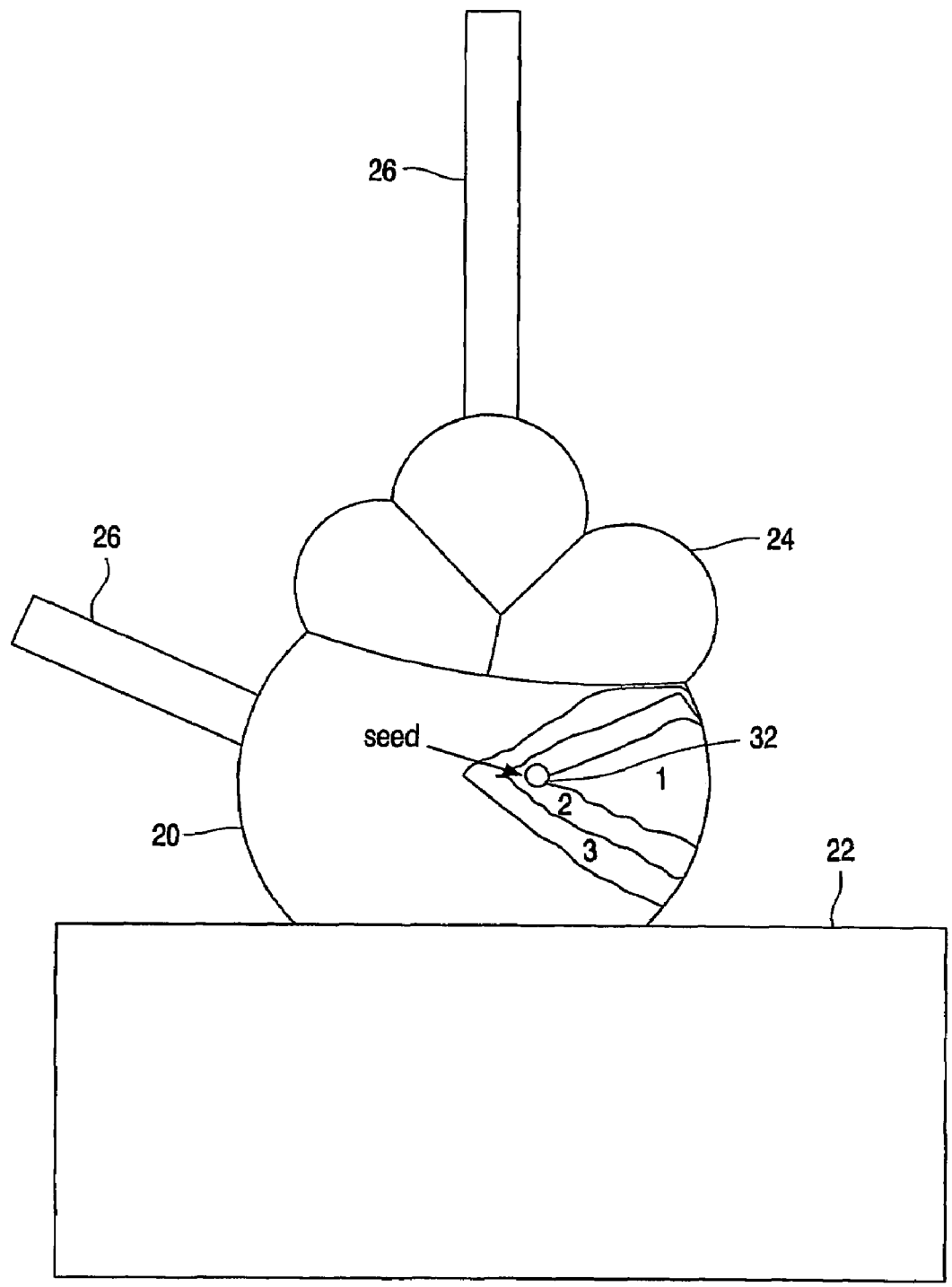
Figure 3D:
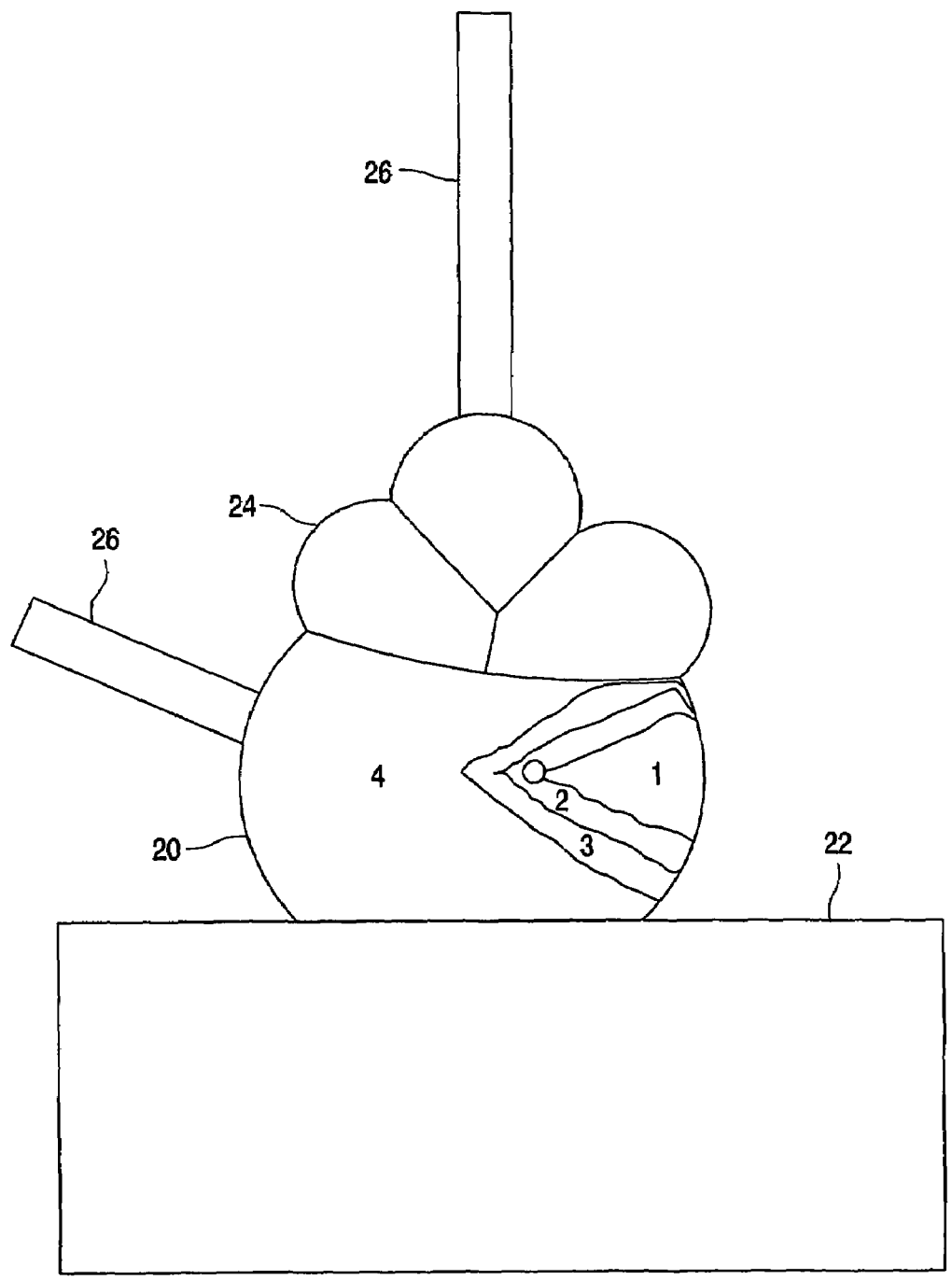
Figure 3E:
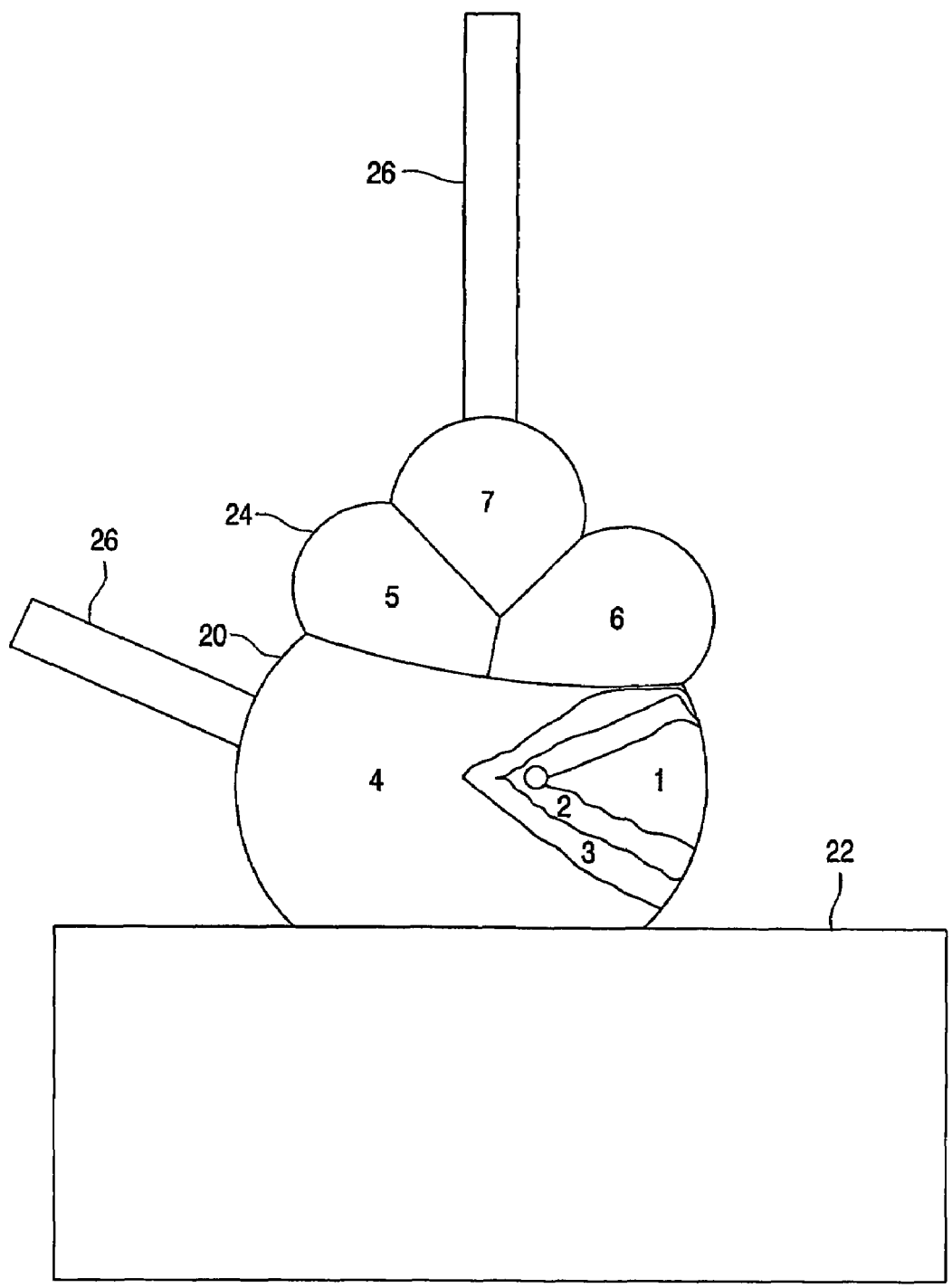
Figure 3F:
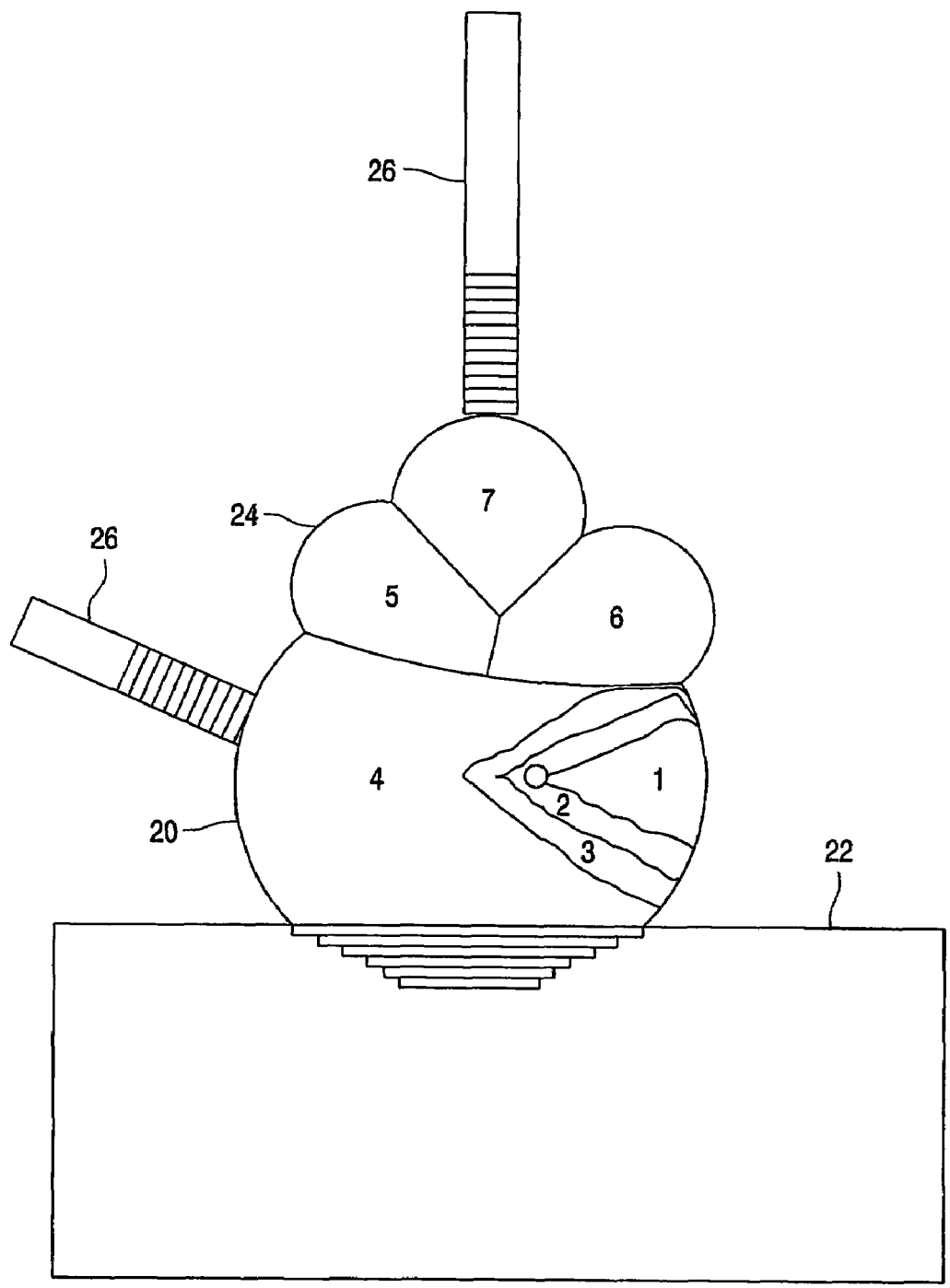

FIGS. 2a to 2c show a flow-chart of an exemplary embodiment of a method for determining a volume of an object from three-dimensional volume data, including graphic information units, which may be operated on the image processing device depicted in FIG. 1. After the start in step S1, the method continues to step S2 where a volume of interest (VOI), including the object, i.e. the tumor, is determined in the three-dimensional volume data.

After the determination of the VOI image cube including the nodule roughly at the center, a query is made with respect to whether there is one nodule in the VOI or whether there is more than one nodule in the VOI. In case it is determined that the VOI includes more than one nodule, the VOI is divided such that each VOI contains only one nodule. Then, the VOI image cube is subjected to a threshold operation at a certain Hounsfield level, where Hounsfield units exceeding a certain Hounsfield threshold are determined. Due to this, the VOI image cube, including the Hounsfield units as graphic information units, is transformed into a 3D binary image, which contains voxels, which are either "in" or "out". The threshold operation is repeated for a series of fixed Hounsfield thresholds, such as for example at −600, −500, −400, −300, −200, −100 HU, in order to produce a volume-vs-HU-threshold-curve, such as the one shown in FIG. 4.

Figure 4:
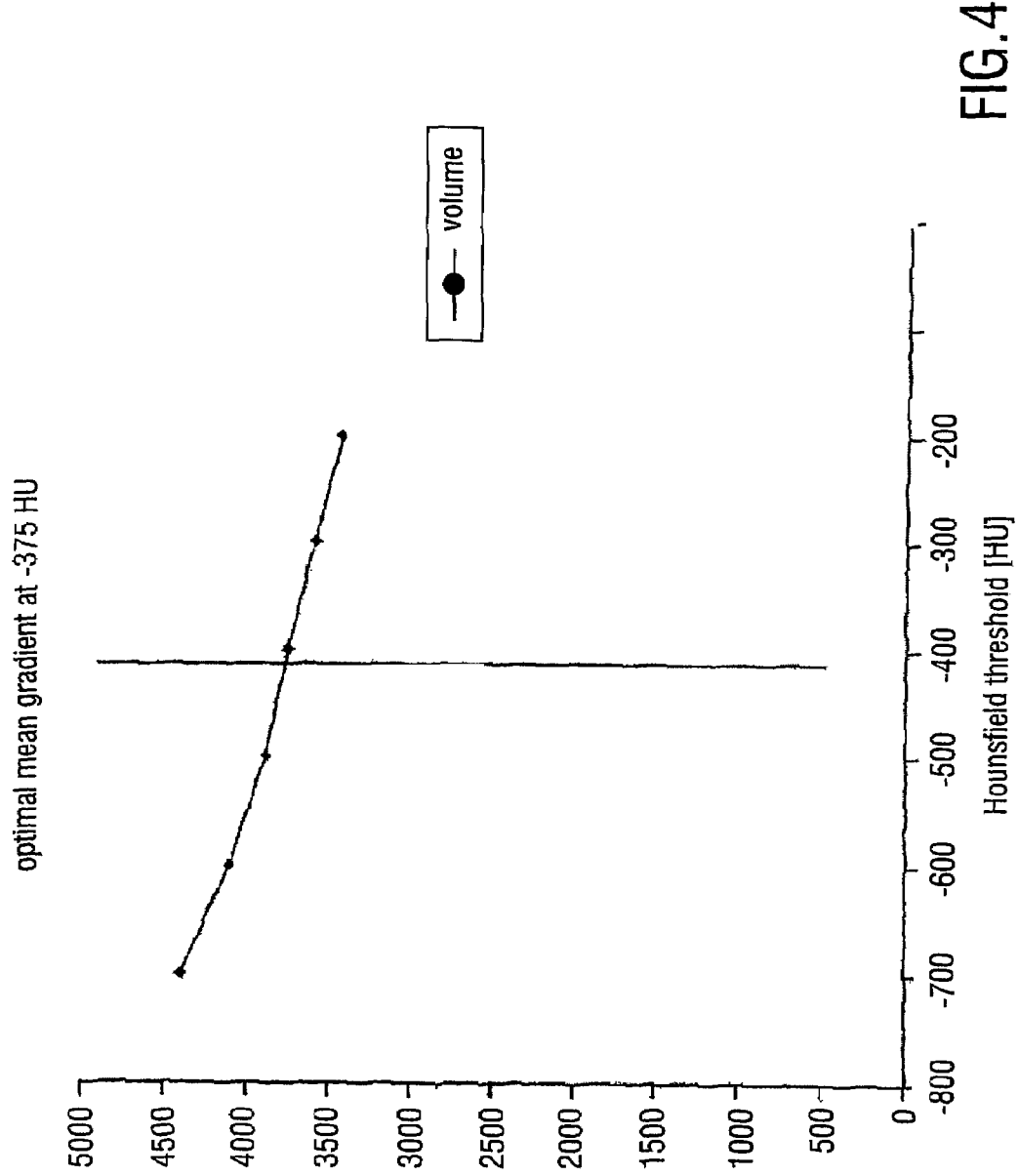
FIG. 4 shows an exemplary volume curve as a function of Hounsfield thresholds used to produce the binary image according to an exemplary embodiment of the present invention.

FIG. 4 shows a volume curve as a function of the Hounsfield thresholds used to produce the binary image. Furthermore, FIG. 4 indicates the Hounsfield thresholds which yield the optimal surface gradient integral, which is approximately 510 HU in the depicted example.

After step S2, the method continues to step S3, where a distance transformation is performed for generating a distance map. For this, the 3D binary image determined in step S2 is subjected to a distance transform. Such a distance transform is for example described in G. Borgefors, "Distance Transformations in Digital Images", Computer Vision, Graphics and Image Processing 34, 344-371, 1986, which distance transform is hereby incorporated by reference. Such distance transform assigns 0 to each "out"-pixel in the 3D binary image. Furthermore, this distance transform assigns the distance of this pixel in the 3D binary image to the nearest "out" pixel to each "in" pixel. The resulting 3D image is referred to as the "distance map" in the following. The distance transformation used in step S3 is realized in 3D and may use the 2-pass algorithm as described by G. Borgefors with integer distance primitives of 10, 14, 17 for steps in x, x-y, x-y-z directions corresponding to step widths of 1, $\sqrt{2}$, $\sqrt{3}$.

After step S3, the method continues to step S4 where a seed point for the expansion growth is determined. The seed point may either be determined by means of a known rough two-dimensional segmentation method applied only to one slice of the scan data to determine an approximate center of the tumor. Although the seed point and the distance map may be manually determined by an operator by clicking onto an image depicting the tumor displayed to the operator via a mouse-pointer. Although it is also possible to select the center of the VOI as seed point. Then, the method continues to step S5.

In step S5, a priority queue is generated. For this, the seed point coordinates and its distance value are put into a priority queue, such as a binary heap structure. The priority queue may be realized as a very efficient binary heap structure such as described by R. Sedgewick, "Algorithms in C", Addison-Wesley, Reading 1990, which is hereby incorporated by reference. In this binary heap structure, an element having the smallest priority is on position 0, which is the lowest in the heap. A determination of the priority will be described with reference to step S20. When a new element is added, the whole heap does not need to be reordered; instead of a complete reordering, a so-called "upheap" procedure and a "downheap" procedure may be sufficient. The upHeap procedure is carried out for adding a new element at the end of the heap and the downHeap procedure is carried out to extract the smallest element of the heap.

Then, the method continues to step S6 in which the elements in the priority tube are labeled as front-voxels. In the following steps S7 to S23, an iterative region growing process is performed. The result of this iterative region growing process is depicted in FIG. 3, showing a drawing a) with a nodule on a lung wall before the region growing is started and the completely expanded regions in drawing f). FIG. 3 will be described in more detail subsequently to the description of FIGS. 5a to 5c.

In step S7 an element having the highest priority value is extracted from the priority queue. At the start, i.e. at the first iteration, the seed voxel is of course the only and thus the highest priority queue element. Then, the method continues to step S8 where a query is made with respect to whether the priority queue is empty or not. In case it is determined in step S8 that the priority queue is empty, the method continues to step S24 as indicated with the encircled E at the bottom of FIG. 2a and the encircled E at the top of FIG. 2b, the encircled F at the bottom of FIG. 2b and the encircled F at the top of FIG. 2c.

In case it is determined in step S8 that the priority queue is not empty, the method continues to step S9, where a query is made with respect to whether the extracted element is labeled as core-voxel or not. In case it is determined in step S9 that the extracted element is not a core-voxel, the method continues to step S11 as indicated with the encircled A at the bottom of FIG. 2a and at the top of FIG. 2b.

In case it is determined in step S9 that the extracted element is a core-voxel, the method continues to step S10, where the extracted element is skipped and the next highest priority value is extracted from the priority queue. Then, the method continues to step S11, as indicated with the encircled A at the bottom of FIG. 2a and at the top of FIG. 2b.

In step S11, an element x is extracted from the priority queue, having the smallest priority value in the priority queue. Then, in the following steps S12 to S18 a "downhill" expansion of the current voxel extracted as the smallest element of the queue is performed.

In the following step S12, the extracted element x is labeled as core-voxel. Then the method continues to step S13 where a downHill specific growth list and an overall growth list are generated, both including the element x. In detail, the current voxel, namely the element x, with position x and distance value D is put onto the downhill specific growth list and also onto the overall growth list and is labeled as core-voxel.

Then, the method continues to step S14 and step S15, where all 26 neighbors of element x in the closest x, y, z neighborhood are checked. In detail, in step S14, all 26 neighbors in the neighborhood of element x are checked to identify a neighboring element x' of the extracted element x with a distance value $$0 < d'(x') < D(x).$$

In other words, a neighboring element x' is determined which has a distance value D'(x')>0 and a distance value smaller than the distance value D (x) of the referring voxel element x. Then, the method continues to step S15, where all 26 neighboring elements x" of element x' are checked which includes of course the referring element x. In detail, in step S15 a neighboring element x" of the element x' is identified having the highest distance value $D''_{max}$ of all elements in the neighborhood of element x'. Then, the method continues to step S16, where the voxel x" is added to the downHill specific growth list and to the overall growth list and is labeled as core-voxel when the maximum distance value $D''_{max}$ determines step S15 is equal but not higher than the distance value D (x) of the referring voxel element x. Then, the method continues to step S17 where a query is made with respect to whether the downHill specific growth list is empty or not. In case it is determined that the downHill specific growth list is not empty, the method continues to step S18.

In step S18 the next element is extracted from the downHill specific growth list as element x. Then, the method returns to step S14.

Advantageously, the expansion rule described with reference to steps S11 to S18 implicitly ensures that the downHill expansion stops at watershed lines of the distance map relief as shown in drawings c) to f) of FIG. 3. The query in step S17 ensures that the downHill expansion iterates until the downhill specific growth list is empty. In case it is determined in step S17 that the downHill specific growth list is empty, the method continues to step S19 as indicated with the encircled B at the bottom of FIG. 2b and at the top of FIG. 2c.

In step S19, current front-voxels with D>0 are identified which are adjacent to at least one core-voxel and are not yet labeled as front-voxels or core-voxels. In particular, it can now be stated that all voxel elements which are now in the overall growth list are current core-voxels. Now, all current front-voxels are identified. These front-voxels are voxels which have a distance value D>0, which means that they are "in" voxels in the 3D binary image and which are adjacent to at least one core-voxel. Although it is necessary that these new front-voxels were not already labeled as front-voxels or core-voxels.

Then, in the following step S20, the priority values of all new front-voxels are calculated. This is made with the aim to insert these new front-voxels into the priority queue in step S21.

As the priority value for each new front-voxel a negative of the maximum directional $2^{nd}$ derivative $L_{max}$ (x) of the voxel element X in the distance map can be taken. The directional $2^{nd}$ derivative at a voxel position X can be approximated as $$L(x) = D(x-r) - 2D(x) + D(x+r),$$

where r is a three-dimensional displacement vector having a length |r|=D (x) given by the distance value D (x) at the central position x. The displacement factor r is rotated through all possible orientations around element x and the maximum value $L_{max}(x)$ is thereby determined. The higher the maximum directional $2^{nd}$ derivative $L_{max}(x)$ is, the less likely it is that the voxel element x is close to the center of the tumor. For example, at the center of a perfect sphere, a value $$L_{max}(x) = -2D(x)$$

is to be expected because of a vanishing D(x±r)=0 such that the lowest $L_{max}(x)$ may be taken for the highest priority.

According to an exemplary embodiment of the present invention to reduce computational efforts, the axes with the displacement vector r may not be rotated on the surface of a sphere around voxel x. Instead, an orthogonal box surface around voxel x may be sampled which is aligned with an x, y, z voxel grid in order to find the maximum directional $2^{nd}$ derivative.

After insertion of the new front-voxels into the priority queue in accordance with their priority in step S21, the method continues to step S22 in which the current sum (DistFrontSum) of all distance values of all front-voxels is calculated. This is simply done by adding to DistFrontSum the distance values of all new front-voxels and subtracting from DistFrontSum the distance values of all voxels which have been labeled as core-voxels during the above downHill expansion.

Then, the method continues to step S23. In step S23, a query is made with respect to whether the distance of the next front-voxel to the seed voxel exceeds a pre-determined threshold. In case it is determined in step S23 that the distance of the next front voxel to the seed voxel exceeds a predetermined threshold, the method continues to step S24 and aborts the growth process. In other words, additionally to an empty priority queue (step S8) the growth process is also aborted if the next front-voxel has a greater distance from the original seed voxel than a predetermined maximum distance. This predetermined maximum distance may be computed by multiplying a factor with the distance value of the seed voxel.

In case it is determined in step S23 that the distance of the next front-voxel to the seed voxel is smaller than a predetermined threshold, the method goes back to step S7 as indicated with the encircled C at the top of FIG. 2c and at the bottom of FIG. 2c and the encircled D at the top of FIG. 2b and the bottom of FIG. 2a.

In case that the conditions for stopping the growth in steps S8 and S23 have been fulfilled, the method continues to step S29 where an iteration i is determined at which DistFrontSum has a minimum. In other words, the iteration number is determined at which the curve of the DistFrontSum values (the sum of the distance values of all current front-voxels) reaches its minimum.

In the following step S27, all voxels which are included in the overall growth list up to the iteration i determined in step S24 can be marked as tumor voxels. Then, on the basis of the tumor voxels, the volume is computed as the number of the tumor voxels, i.e. the number of core-voxels in the overall growth list before the cutoff point, which are multiplied by the x, y, z sampling resolution. The "effective diameter" (volume-equivalent diameter) is given as $$D_{eff} = 2 \cdot [V \cdot 3/(4\pi)]^{1/3}.$$

Either the volume or the number of tumor voxels corresponding to the volume of the tumor may be outputted to an operator. Then, the method continues to step S26 where it ends.

Figure 9:
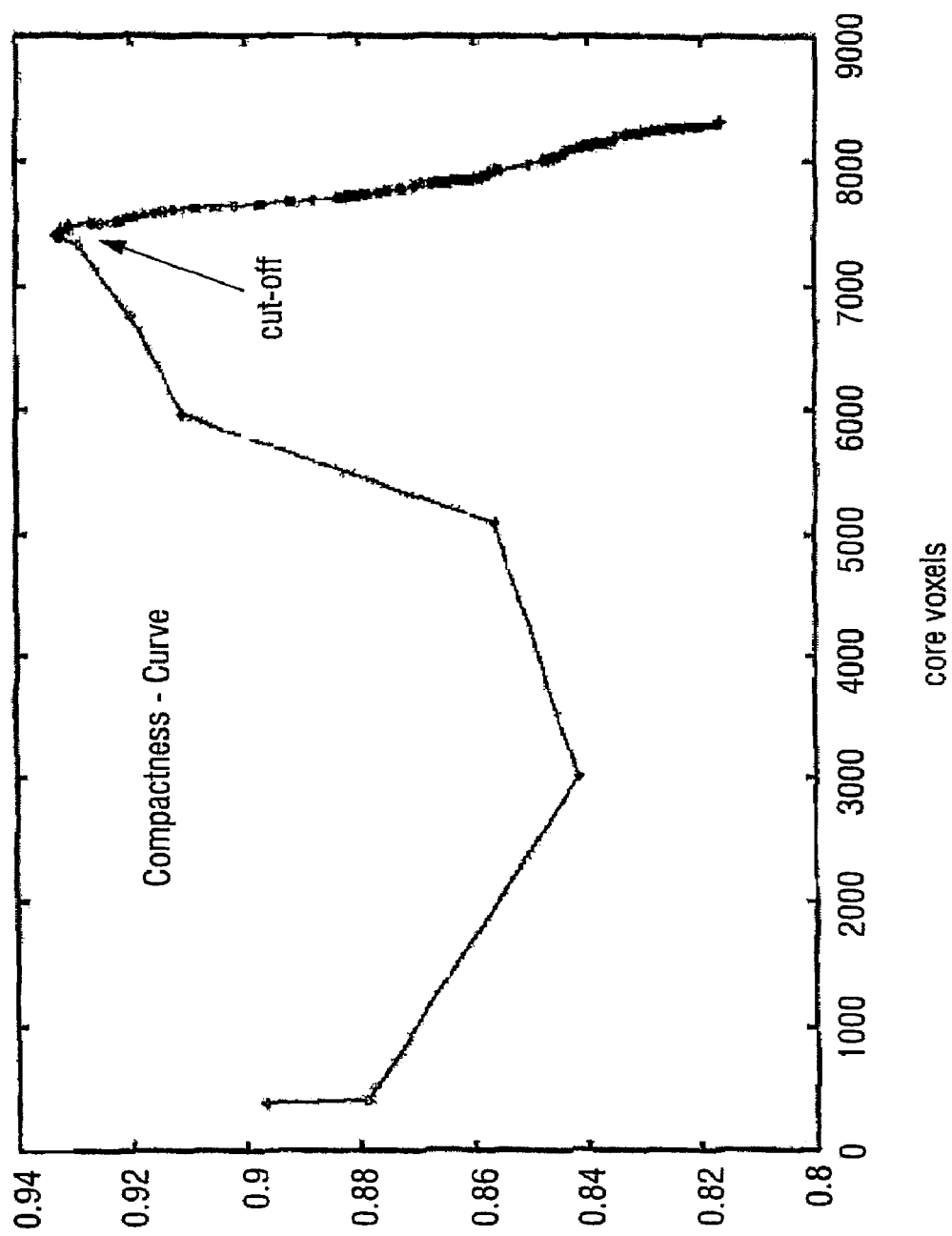
FIG. 9 shows a curve of compactness of the current core-voxels.

In a variant of the method depicted in FIG. 2a to 2c, the minimum DistFrontSum criterion (step S22 and S24) can be refined by introducing a further ancillary cutoff criterion. The ancillary cutoff criterion is based on the compactness of the core-voxels at each iteration step. Compactness curves are shown in FIGS. 9 and 10. The compactness of a body of voxel (core) can be measured on the basis of a relation between surface and volume, such as for example suggested by D. Wormanns et al "Clinical Evaluation of the Reproducibility of Volume Measurements of Pulmonary Nodules, Proc. SPIE Medical Imaging 2002, SPIE vol. 4684, pp. 316-322, which is hereby incorporated by reference.

However, for small tumors with relatively few voxels, the surface area is difficult to estimate. The measure of front-voxels and core-voxels becomes very crude for tumors of only few voxels and is moreover not invariant against the orientation of the tumor with respect to the x, y, z voxel grid. According to the present invention, a more robust compactness measure is derived from the spatial standard deviation of the voxel, which is minimal for a perfect sphere. The spatial standard deviation may be estimated as the root mean square distance between all voxels $x_i$ and their center m:

$$S=[\Sigma|x_i-m|^2]^{1/2}$$

This can actually be determined as the square root of a trace of a spatial covariance matrix. A perfect sphere of radius R has a spatial standard deviation of $$S=3/5R^2$$

and a volume of $$V=4\pi/3R^3.$$

Thus, a volume-equivalent-radius $R_v$ of a tumor can be estimated as $$R_v=[V\cdot 3/(4\pi)]^{1/3}$$

where the volume V is the number of voxels (multiplied by the voxel dimensions) and likewise the spatial-deviation-equivalent-radius $R_S$ can be estimated as $$R_S=[S\cdot 5/3]^{1/2}.$$

Furthermore, the compactness C of a tumor can be estimated as:

$$C=R_V/R_S$$

which is 1 for a perfect sphere and which is otherwise lower. Preferably, numerical effects should be neglected here. Advantageously, this compactness measure allows that all voxels contribute to both magnitudes $R_V$ and $R_S$ such that it is numerically more robust than a comparison of ratios between front- and core-voxels.

The compactness curve (FIGS. 9 and 10) can be analyzed to determine the iteration with the maximum compactness. If at this compactness peak the core-voxels already included are more than 80% of the number of voxels given by the minimum DistFrontSum cutoff criterion, then the cutoff point is shifted back to the point of maximum compactness instead of the minimum of the DistFrontSum. Advantageously, this has the effect that thin vessels which come out of the nodule but reach the thinness diameter only after a certain distance from the nodule are cut off at their origin from the nodule. This can be taken from a comparison of FIG. 10 to FIG. 8 as indicated by the arrow between both Figures.

In the following, the method described with reference to FIGS. 2a to 2c according to the present invention is first described with reference to drawings a) to f) of FIG. 3, which are exemplary sketching a binary image of a tumor attached to the lung wall with lobules and two connecting vessels to which the method according to the present invention is applied.

Drawing a) of FIG. 3 shows an exemplary sketch of a binary image of a tumor 20 attached to a lung wall 22. The tumor has a plurality of lobules 24 and two connecting vessels 26. In drawings a) to f) of FIG. 3, the same reference numerals are used to designate the same or corresponding elements.

In drawing b), local maxima 28 and ridge lines 30 of the distance map of the tumor are depicted. In drawing c), a seed point 32 as determined in step S4 is depicted as well as the first three iterations of the downHill expansion. Drawing d) shows the situation after four iterations. In drawing e), the situation is shown after six iterations. As can be taken from drawing e), the tumor 20 including the lobules 24 are completely extracted. The growth of the fourth iteration was stopped at the lung wall 22.

Drawing f) shows the situation after a plurality of iterations. As can be taken from drawing f) the expansion growth of the segmented volume does not grow into the connected vessels 26. Also, despite of not growing into the connected vessels 26, lumps, lobules and spiculi on the surface of the tumor 20 are not cut off. Furthermore, advantageously, the segmented volume does not grow into the lung wall or diaphragm. Furthermore, despite of not growing into the lung wall, even if a small nodule is segmented, this small nodule, such as a peanut shaped nodule, is not cut off at the "waist line". Advantageously, according to the present invention as may be taken from drawings a) to f) of FIG. 3, the cutoff of the connecting structures takes place at the location of the thinnest connection and the cutoff surfaces are parallel to the skeleton, i.e. the cutoff surface is parallel to the lung wall 22 in drawing f). Furthermore, in spite of not being mathematically invariant, the present invention is robust against shifts in the seed point and is therefore insensitive against the starting seed point.

FIG. 4 shows a volume curve as a function of the Hounsfield thresholds used to produce the binary image. The vertical line in this diagram indicates the Hounsfield thresholds, which yields the optimum surface gradient interval.

Figure 5:
FIG. 5 shows a surface rendering of a nodule attached to the lung wall and vessels, which may be measured in accordance with the method according to an exemplary embodiment of the present invention.
Figure 6:
FIG. 6 shows a rendering of the same nodule as seen from outside the lung to illustrate a cutoff surface between the nodule and the lung wall as realized with the method according to the exemplary embodiment of the present invention.

FIG. 5 shows a surface rendering of a nodule attached to a lung wall and vessels and FIG. 6 shows the rendering of the same nodule as seen from outside the lung, to illustrate the cutoff surface between the nodule and the lung wall. As apparent to the skilled person, advantageously, the cutoff surface is essentially perpendicular to the skeleton, such that a cutoff face parallel to the surface of the lung is realized. Also it can be taken from FIGS. 5 and 6 that the cutoff of connecting structures takes place at locations of the thinnest connections.

Figure 7:
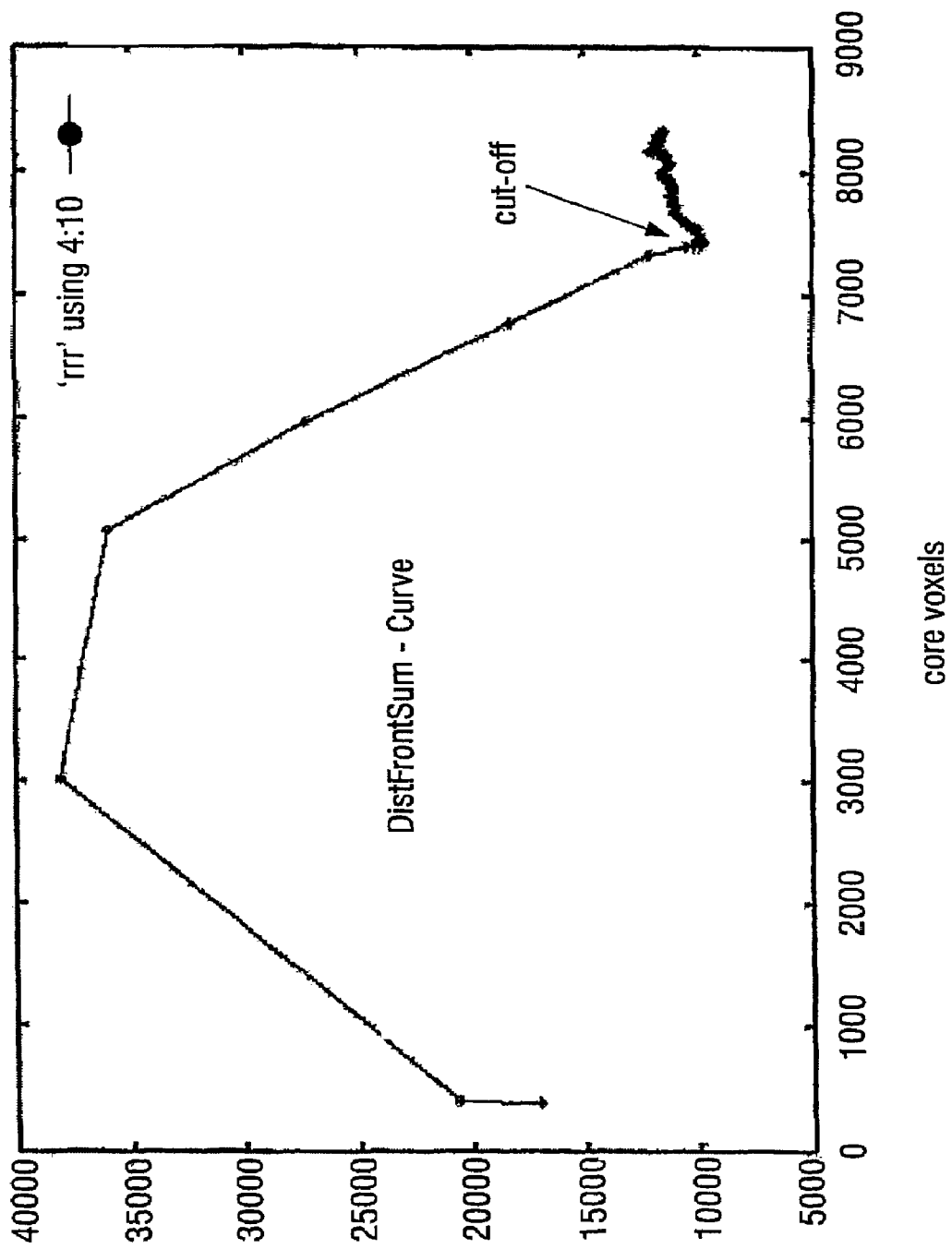
FIG. 7 shows a curve of the sum of distance values of front-voxels as a function of a number of core-voxels.

FIG. 7 shows a curve of the sum of distance values of the front-vowels (DistFrontSum) as a function of the number of core-voxels. As can be taken from FIG. 7, the cutoff occurs after 7425 voxels. It is clearly visible that the growing speed is very fast at the beginning or start and slows down later on. This means that the growth rate is significant at the beginning, whereas it slows down later on. This ensures that tumors are grown outward into spiculi and lobules.

Figure 8:
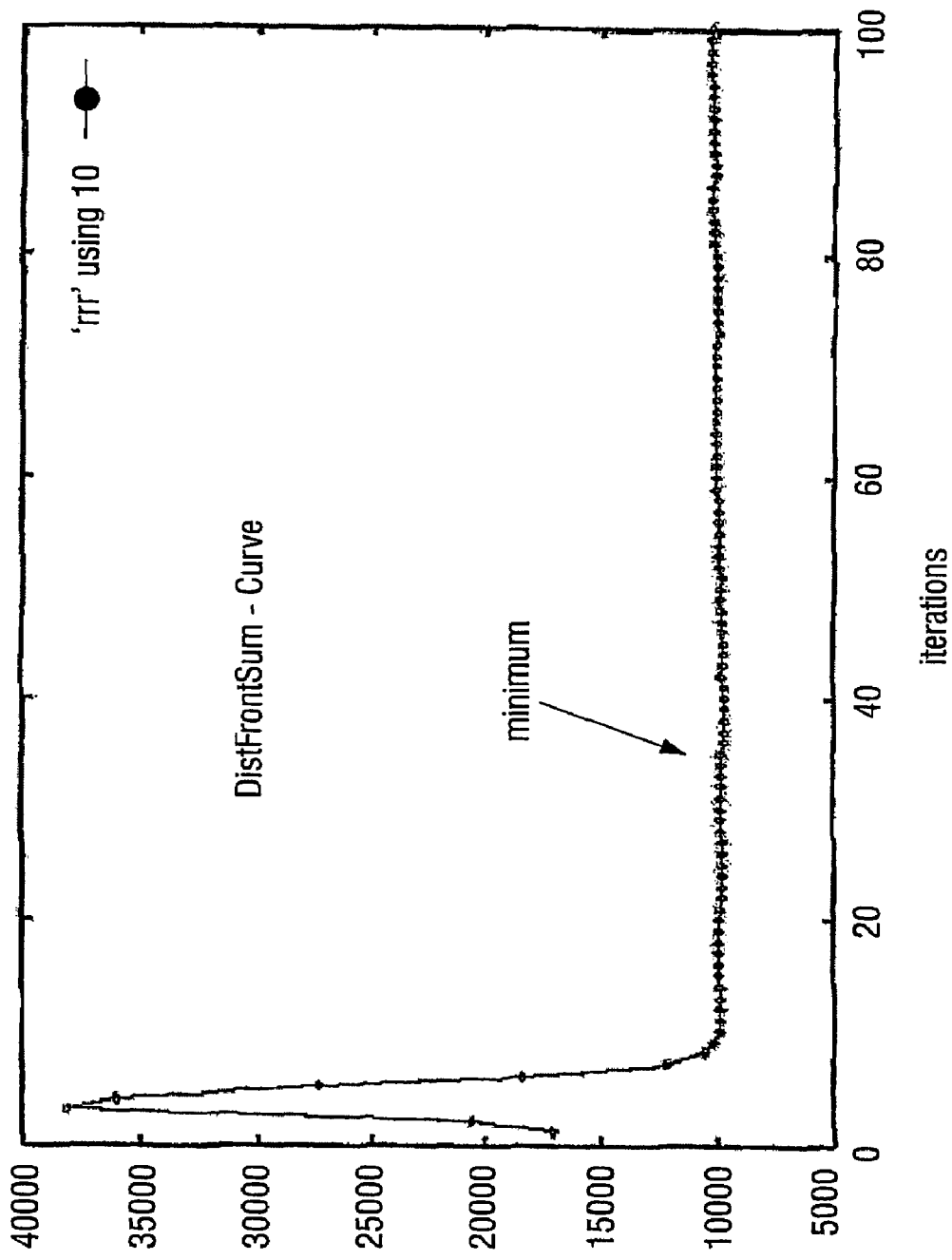
FIG. 8 shows a curve of the sum of distance values of the front-voxels as a function of iterations.

FIG. 8 shows a curve of the sum of distance values of the front-voxels (DistFrontSum) as a function of iterations or downHill expansions. As can be taken from FIG. 8, a cutoff occurs after 45 iterations.

FIG. 9 shows a curve of compactness of the current core-voxels. According to the MaxCompactness-criterion described above, which is applied here, the cutoff occurs after 7396 voxels.

FIG. 10 shows a compactness as a function of iterations or downHill expansions. As can be taken from FIG. 10, the cutoff occurs after 13 iterations.

As already noted above, the present invention can be applied to any kind of volume measurement of objects or regions of interest in three-dimensional volumes. Preferably, the present invention is applied in medical applications where the three-dimensional datasets are acquired by means of x-ray scanners, MR scanners or CT scanners or similar types of systems.

The invention claimed is:

1. A method performed by an image processing device for determining a volume of an object from three-dimensional volume data including graphic information units, comprising:
using the image processing device to perform steps comprising:
determining a volume of interest including the object;
determining thresholds of the graphic information units in the volume of interest;
performing a distance transform on a basis of the thresholds for determining a distance map consisting of voxels;
providing a seed point in the distance map, which seed point is on the object;
determining a number of core-voxels and a number of front-voxels by using the seed point; and
determining the volume of the object on a basis of the number of core-voxels and the number of front-voxels,
wherein at least one of the determination of the number of core-voxels and the number of front-voxels is performed by a downhill expansion of the voxels, and
wherein the voxels are immediately expanded as long as a growth is directed downwards in a relief of the distance map such that a growth speed is varying.

2. The method of claim 1, further comprising the step of: ensuring that the growth continues close to an approximate center of the object by using a priority criterion for directing the growth, wherein the priority criterion is based on a maximum directional second derivate in the distance map.

3. The method of claim 1, further comprising the steps of: determining a curve of a sum of voxel distance values of the front voxels in the distance map; determining a minimum of the curve; and deciding on a point to cut off the growth by using the minimum.

4. The method of claim 1, wherein the object consists of at least one nodule attached to one of the lung wall, the diaphragm and a vessel of the surrounding vasculature and wherein the graphic information units correspond to Hounsfield units.

5. Image processing device, comprising:
a memory for storing three-dimensional volume data; and
an image processor for determining a volume of an object from the three-dimensional volume data which includes graphic information units, which image processor is adapted to perform the following operations:
determining a volume of interest including the object;
determining thresholds of the graphic information units in the volume of interest;
performing a distance transform on a basis of the thresholds for determining a distance map consisting of voxels;
providing a seed point in the distance map, which seed point is on the object; determining a number of core-voxels and a number of front-voxels by using the seed point; and
determining the volume of the object on a basis of the number of core-voxels and the number of front-voxels,
wherein at least one of the determination of the number of core-voxels and the number of front-voxels is performed by a downhill expansion of the voxels, and
wherein the voxels are immediately expanded as lone as a growth is directed downwards in a relief of the distance map and wherein a growth speed is varying.

6. The image processing device of claim 5, wherein the image processor is further adapted to perform the following operation: ensuring that the growth continues close to an approximate center of the object by using a priority criterion for directing the growth, wherein the priority criterion is based on a maximum directional second derivate in the distance map; determining a curve of a sum of voxel distance values of the front voxels in the distance map: determining a minimum of the curve; and deciding on a point to cut off the growth by using the minimum.

7. The image processing device of claim 5, wherein the image processing device is a computer aided tumor volumetric measuring device for computer aided volumetric measurements on a basis of computed tomography (CT) image scans.

8. Computer program embodied on a computer-readable medium comprising computer code means for performing the following operation for determining a volume of an object form three-dimensional volume data including graphic information units when the computer code means is executed on a computerized image processing device:
determining a volume of interest including the object;
determining thresholds of the graphic information units in the volume of interest;
performing a distance transform on a basis of the thresholds for determining a distance map consisting of voxels;
providing a seed point in the distance map, which seed point is on the object;
determining a number of core-voxels and a number of front-voxels by using the seed point; and
determining the volume of the object on a basis of the number of core-voxels and the number of front-voxels,
wherein at least one of the determination of the number of core-voxels and the number of front-voxels is performed by a downhill expansion of the voxels, and
wherein the voxels are immediately expanded as lone as a growth is directed downwards in a relief of the distance map such that a growth speed is varying.

* * * * *